United States Patent [19]

Tusing

[11] 4,136,746
[45] Jan. 30, 1979

[54] BEARING ASSEMBLY FOR FARM IMPLEMENTS INCORPORATING ROTATABLE DISCS

[76] Inventor: Arthur P. Tusing, P.O. Box 64, Dell, Ark. 72426

[21] Appl. No.: 799,446

[22] Filed: May 23, 1977

[51] Int. Cl.² ............................................ A01B 71/04
[52] U.S. Cl. ..................................... 172/599; 308/19; 308/181; 308/174
[58] Field of Search ............... 172/518, 601, 599, 600; 308/19, 181, 174

[56] References Cited

U.S. PATENT DOCUMENTS

| | | | |
|---|---|---|---|
| 1,391,853 | 9/1921 | Press | 308/19 |
| 1,506,782 | 9/1924 | Silver | 308/181 |
| 2,097,244 | 10/1937 | Sjogren | 172/599 |
| 2,191,098 | 2/1940 | Rapp | 308/18 |
| 2,556,492 | 6/1951 | Dockery | 172/599 |
| 2,790,367 | 4/1957 | Simmons | 172/600 |
| 3,088,527 | 5/1963 | Burch | 172/599 X |

Primary Examiner—Richard J. Johnson

[57] ABSTRACT

The subject bearing assembly is characterized by bearing structure for axially supporting the disc blade arrangement while simultaneously providing optimum support against the lateral or thrust forces acting upon the disc blade arrangement, i.e., thrust forces normally brought about as the disc blades obliquely attack and prepare the soil. The bearing structure includes a rotatable axle having at least one radial ball-bearing sub-assembly circumposed thereabout for taking the axle load, and at least one thrust ball-bearing sub-assembly circumposed about the rotatable axle and having a pair of lateral races for taking the lateral load. A spacer sleeve member is also incorporated for establishing an optimum non-binding relationship between the lateral races irrespective of lateral compression forces which are developed in frictionally urging the sub-assemblies and the spacer sleeve member together in attaching the disc members to the rotatable axle.

6 Claims, 4 Drawing Figures

BEARING ASSEMBLY FOR FARM IMPLEMENTS INCORPORATING ROTATABLE DISCS

BACKGROUND OF THE INVENTION

1. Field of the Invention

This invention relates to the field of farm implements incorporating rotatable discs and is particularly directed toward bearing assemblies for rotatably supporting the discs.

2. Description of the Prior Art

Numerous bearing assemblies having similarity to the instant invention have heretofore been developed. In fact, applicant is aware of the following patents pertaining to such devices: Lewis U.S. Pat. No. 2,560,965; Birdwell U.S. Pat. No. 2,580,508; Birt U.S. Pat. No. 2,597,524; McCullough U.S. Pat. No. 2,597,942; McCallum U.S. Pat. No. 2,850,337; Davies U.S. Pat. No. 2,858,757 and Gillies U.S. Pat. No. 3,980,355. None of the above patents suggest or disclose applicant's device which is intended to be incorporated with disc plows and/or harrows, hipper ridgers, or rolling bedder equipment used in seed bed preparation and other farm implements of the type having rotatable disc blades used in land preparation.

The accepted practice used in the manufacturing of disc plows and/or harrows or hipper ridgers is to mount the disc blades on an axle fitted only with radial bearings. The oblique angle of the disc blades when penetrating the soil and moving it laterally causes a great amount of thrust or pull force to be transferred to the bearings. These bearings are designed to absorb radial pressure only, i.e., axle loads, and this lateral force causes damage to the seals eventually resulting in complete failure of the bearings. Replacing these bearings is a continuing source of aggravation for the farmer since he is not only denied the use of the equipment, (usually during a peak work-load period) but the man hours involved in effecting the bearing change is exorbitant and costly, i.e., particularly since the parts become siezed during prolonged usage.

It will be appreciated by those skilled in the art that the prior art by and large utilized tapered roller bearings for rotatably supporting the disc structure of the typical farm equipment. However, tapered bearings have a distinct disadvantage in that the adjustment thereof is very critical or maladjustment is rather common. Improperly adjusted tapered bearings cause the seal to quickly fail, allowing dirt to enter the bearing assembly which obviously causes bearing failure. It should be pointed out that the problem of thrust or lateral lateral load acting on the prior bearing assemblies has heretofore been recognized. However, the solution to the problem has been, almost without exception, to incorporate tapered roller bearings which, for the above mentioned reasons, are unsatisfactory.

SUMMARY OF THE INVENTION

The present invention is directed towards overcoming the disadvantages and problems relative to previous bearing assemblies for farm implements incorporating rotatable discs, particularly the problem created as a result of the lateral thrust acting on the disc blades. The concept of the present invention is to provide a bearing assembly for axially supporting the disc blade arrangement while simultaneously providing optimum support against the lateral or thrust forces acting upon the disc blade arrangement, i.e., thrust forces normally brought about as the disc blades obliquely attack and penetrate the soil during land preparation. A hipper ridger or rolling bedder is one of the latest implements to be introduced into modern farming. The thrust forces acting upon this type of equipment are much greater than experienced in disc harrows and the like. Therefore, the bearing assembly of the invention is significantly valuable in keeping this latter type equipment rolling. The bearing structure of the present invention includes a rotatable axle having at least one radial ball-bearing sub-assembly circumposed thereabout for taking the axle load, and at least one thrust ball-bearing sub-assembly circumposed about the rotatable axle and having a pair of lateral races for taking the lateral load. A spacer sleeve member is also incorporated for establishing an optimum non-binding relationship between the lateral races irrespective of lateral compression forces which are developed in frictionally urging the bearing sub-assemblies and the spacer sleeve member together in attaching the disc members to the rotatable axle.

DESCRIPTION OF THE PREFERRED EMBODIMENT

Figure 1:
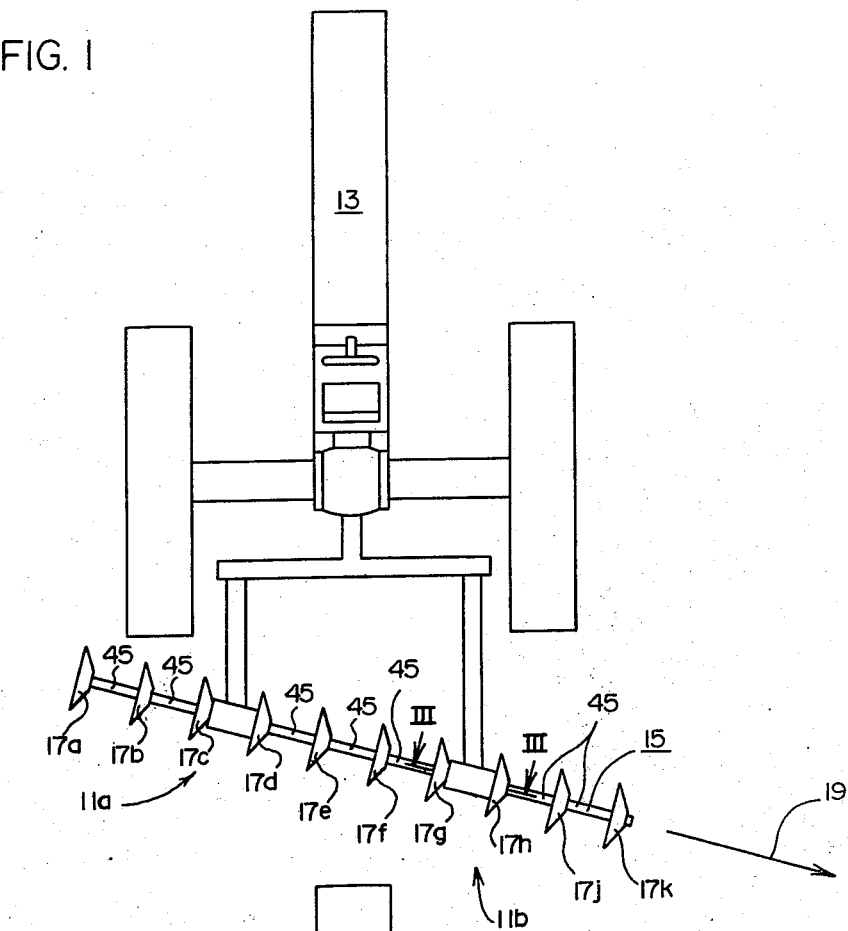
FIG. 1 is a top plan view of a typical farm tractor shown drawing a disc harrow having numerous disc blades attached to a single rotatable axle supported by two bearing assemblies of the present invention.

The bearing assembly 11 of the present invention is intended for use with farm implements incorporating rotatable discs. For example, FIG. 1 depicts a farm tractor 13 drawing a disc harrow or rotary disc plow 15 which incorporates a pair of bearing assemblies 11 which are individually designated as 11a, 11b, one of which is clearly shown in FIG. 3 of the drawings. In other words, the bearing assembly 11 is intended for use in various farm implements generally of the type having disc blade means 17, individually designated as 17a, 17b, 17c, etc., in FIG. 1 of the drawings, for obliquely attacking and preparing the soil. Thus, this developes a lateral thrust in the direction of an arrow 19 as shown in FIGS. 1 and 3, et al of the drawings.

The bearing assembly or bearing means 11 of the present invention is for axially supporting the disc blade means 17 while simultaneously providing optimum support thereof against the lateral forces, indicated by the arrow 19, acting thereon. The bearing means 11 generally includes at least one radial bearing means 21 having inner and outer axial races, respectively as at 23, 25, for taking the axle load in the normal manner. The bearing assembly 11 also includes at least one thrust bearing means, as at 27, having a pair of lateral races, as at 29, 31, for taking the lateral load, i.e., the lateral load as being exerted in the direction of the arrow 19. It should be understood that the radial bearing means 21 and/or the thrust bearing means 27 may be constructed in various fashions conforming to the latest state of the art. For example, "Teflon" and other more recently developed products may be used in the construction thereof if deemed desirable. However, in this disclosure, the more conventional construction will be relied upon for disclosing the concept of the instant invention.

Accordingly, the inner and outer races 23, 25 are rotatably maintained in a spaced apart distance by a plurality of individual bearing elements, e.g., spherical steel balls 33 and the like, in a manner well known to those skilled in the art. Likewise, the lateral races 29, 31 are rotatably supported in a spaced apart distance by a plurality of bearing elements, e.g., spherical steel balls 35 and the like, in a manner well known to those skilled in the art.

Figure 3:
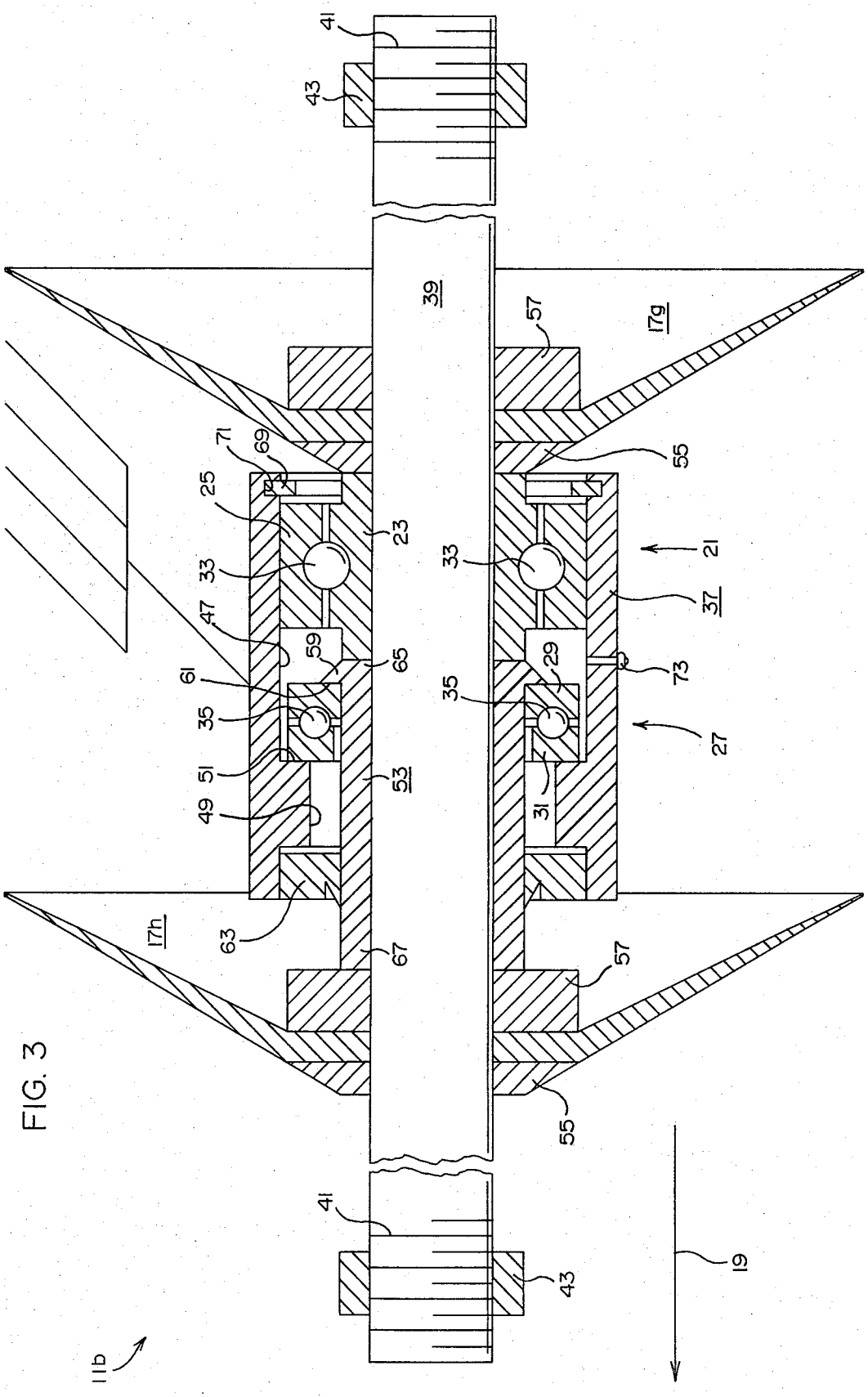
FIG. 3 is a sectional view taken as on the line III—III of FIG. 1.

The bearing means 11 includes fixed hub means 37 having a rotatable axle 39 extending therethrough with at least a pair of disc blade members, e.g., the blade members 17g, 17h or the like, being disposed at either end of the hub means 37, as clearly shown in FIG. 3 of the drawings. Also included are attachment means, e.g., providing the axle 39 with threads 41 for threadedly receiving a nut 43 or the like, for frictionally removably attaching the pair of disc blade members 17g, 17h, etc., to the axle 39 for rotation therewith. More specifically, the axle 39 receives the plurality of disc blades 17a through 17k and either end of the axle 39 is provided with the threads 41 which receive the nut 43 as shown in FIG. 3 of the drawings. However, spool-like spacers, as at 45 in FIG. 1, maintain a proper spacing between certain disc blades, e.g., the disc blades 17a, 17b; 17e, 17f; 17j, 17k; etc., i.e., the axle 39 extends through the spool-like spacers 45 in a manner well known to those skilled in the art or in substantially the same manner as taught in a U.S. patent to Birdwell, No. 2,580,508.

From FIG. 3 of the drawings it may be seen that the radial bearing means 21 and the thrust bearing means 27 are circumferentially disposed about the axle 39 and engage the interior surface, as at 47, of the hub means 37. Additionally, it may be seen that the radial and the thrust bearing means 21, 27 respectively have fixed and rotatable races, i.e., the races 25, 31 are fixed while the races 23, 29 rotate with the axle 39.

The hub means 37 includes a reduced diameter portion, as at 49, establishing inwardly directed annular shoulder means, as at 51, for restingly engaging the thrust bearing means 27 or more specifically the fixed race 31 thereof.

The bearing means 11 also includes means, e.g., spacer sleeve means 53, for engaging and maintaining the thrust bearing means 27 in an abutting relationship with the inwardly directed annular shoulder means 51 while simultaneously establishing an optimum non-binding relationship between the pair of lateral races 29, 31 as binding torque is applied to the attachment means, i.e., the nuts 43 or the like, in attaching the pair of displaced members 17g, 17h, etc., to the axle 39. It should be understood that typical annular spacers may be incorporated if deemed desirable. For example, disposed on either side of certain disc blades, e.g., the disc blade 17h, etc., are disposed spacer members 55, 57 which frictionally engage the disc blade 17h. Accordingly, as the proper torque is applied to the nuts 43 extensive lateral compression forces are developed in frictionally urging the disc blade members 17g, 17h together, i.e., the disc blade 17g and its associated spacer members 55, 57 are urged to the left so as to frictionally engage the inner or rotatable race 23 which in turn frictionally engages the spacer sleeve means 53, which in turn engages the disc blade 17h and the spacer members 55, 57 associated therewith and all of which rotate in unison with the rotatable axle 39. It should be pointed out that spacer sleeve means 53 is slip-fitted about the axle 39 with the thrust bearing means 27 being circumposed thereabout for establishing an optimum non-binding relationship between the pair of lateral races 29, 31 irrespective of the lateral compression forces developed in frictionally urging the pair of disc blade members 17g, 17h together as torque is applied to the nuts 43.

From FIG. 3 of the drawings it may be seen that the spacer sleeve means 53 includes an enlarged diameter portion, as at 59, establishing outwardly directed annular shoulder means, as at 61, for engaging and restingly supporting the rotatable race 29 of the thrust bearing means 27. The shoulder means 61 transfers the thrust force to the thrust bearing means 27, i.e., when exerted in the direction of the arrow 19.

The bearing assembly 11 also includes grease-seal means 63 disposed at one end of the hub means 37 with the radial bearing means 21 being disposed at the opposite end of the hub means 37 as clearly shown in FIG. 3 of the drawings. The thrust bearing means 27 is interposed between the grease-seal means 63 and the radial bearing means 21. The proximal end, as at 65, of the spacer sleeve means 53 has an abutting engagement with the rotatable race 23 of the radial bearing means 21. The grease-seal means 63 is circumposed about the spacer sleeve means 53 in a close-fitting relationship so as to prevent any leaking of grease from the hub means 37 and to prevent dust and other foreign particles from entering the interior of the hub means 37. The distal end, as at 67, of the spacer sleeve means 53 extends outwardly from the hub means 57 so as to assume an abutting relationship with the spacer member 57. The fixed race 25 of the radial bearing means 21 contiguously engages the interior surface 47 of the hub means 37. The grease-seal means 63 is adapted for snug-fitting relationship with the hub means 37 in a manner well known to those skilled in the art.

A snap-ring, as at 69 or the like, is included for maintaining the radial bearing means 21 and the thrust bearing means 27 as well as the spacer sleeve member 53 in proper position within the hub means 57. The snap-ring 69 is received in an annular groove 71 provided in the hub means 57, i.e., in a manner well known to those skilled in the art.

The radial bearing means 21 preferably consists of the well known sealed bearing structure. Thus, the grease-seal means 63 and the sealed radial bearing means 21 jointly shield the thrust bearing means 27 against dust and other harmful contaminants.

The bearing assembly 11 also preferably includes grease-gun fitting means, e.g., a well known zerk fitting 73 or the like, for facilitating filling the interior of the hub means 37 with lubricating grease, i.e., utilizing any of the well known grease guns which are readily adaptable to the zerk fitting 73.

Figure 2:
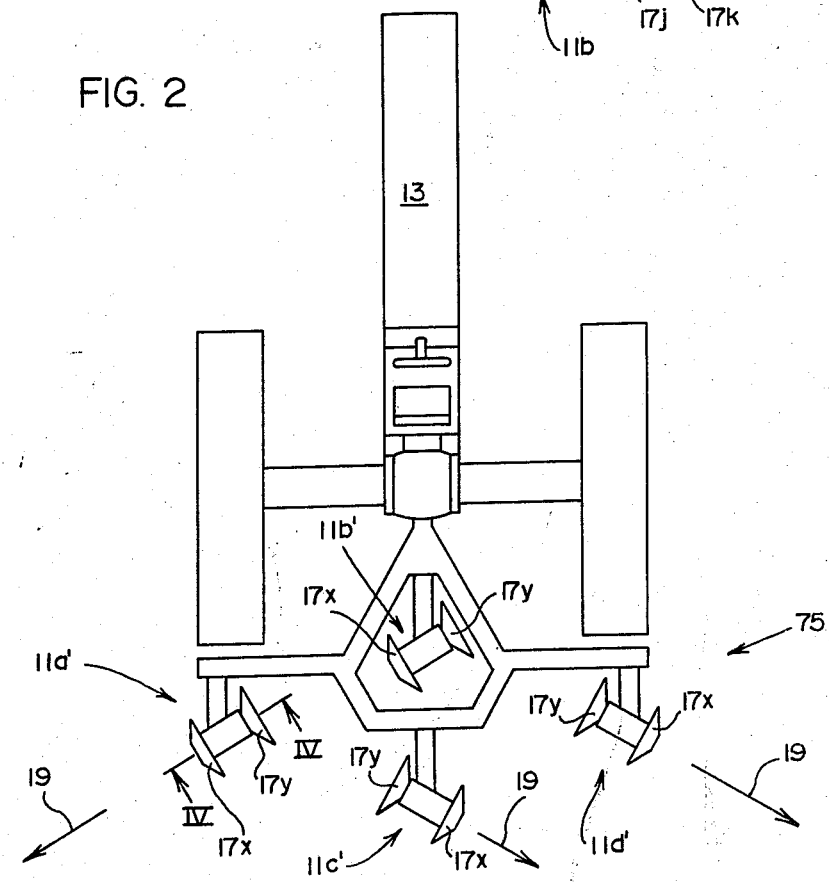
FIG. 2 is a top plan view of a typical farm tractor shown drawing a two-row hipper ridger or rolling bedder which incorporates four individual bearing assemblies of the present invention.
Figure 4:
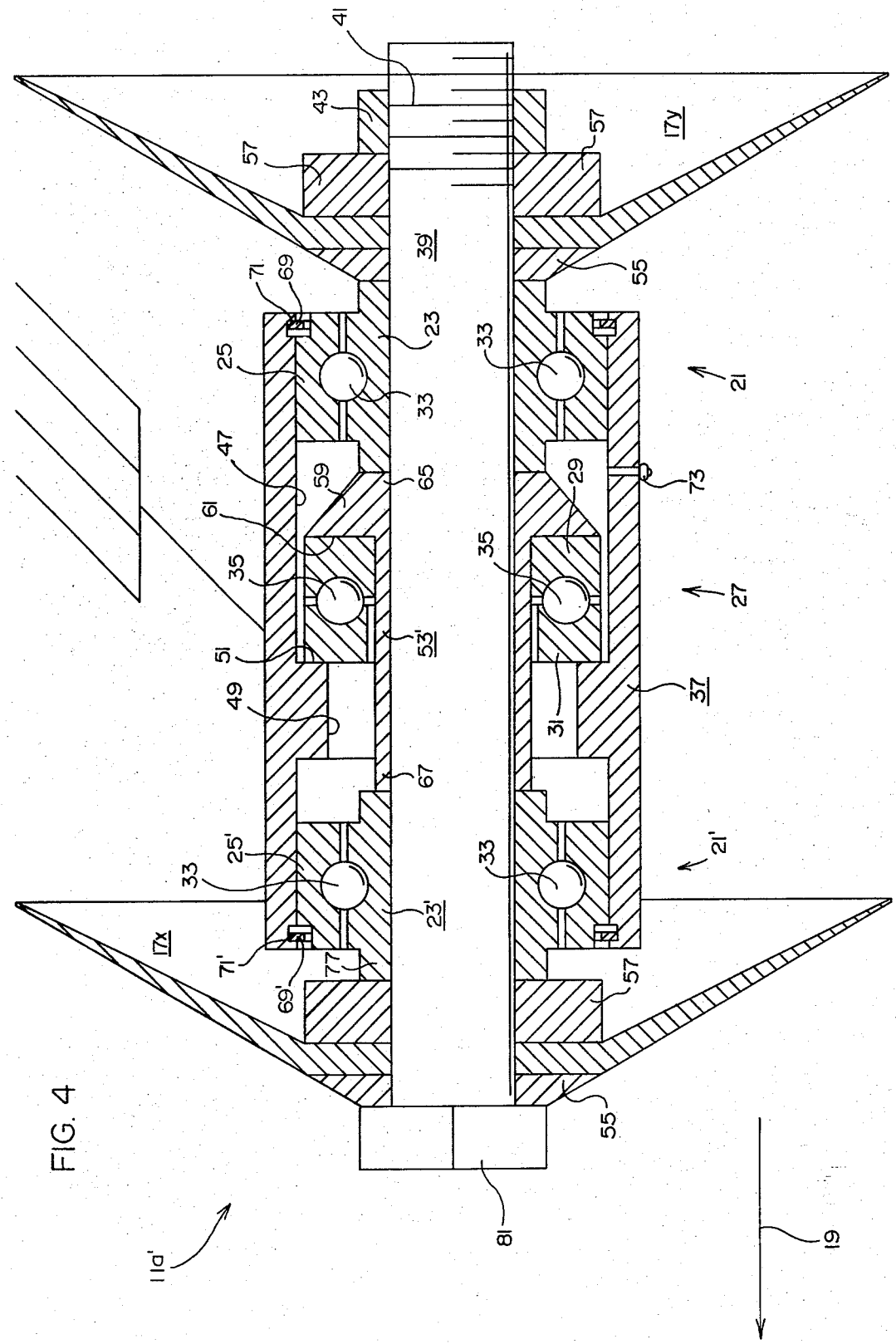
FIG. 4 is a sectional view taken as on the line IV—IV of FIG. 2.

From FIG. 2 of the drawings it may be seen that an alternate embodiment of the bearing assembly is disclosed and which is intended to be incorporated with rolling bedder or hipper ridger seedbed preparation farm implements, i.e., the hipper ridger is characterized by the numeral 75. The hipper ridger 75 as shown in FIG. 2 is of the two-row type of construction which utilizes four independent bearing assemblies (alternate embodiments) of the present invention, which are individually designated at 11a', 11b', 11c' and 11d'. It should be pointed out that hipper ridgers are available in one and four-row arrangements as well as six and eight-row arrangements which, of course, utilize considerably more of the bearing assemblies than shown in FIG. 2, i.e., the two-row unit as shown in FIG. 2 considered to be the best example of the group. However, irrespective of the number of rows the hipper ridger 75 is capable of preparing with each pass, the alternate embodiment of each bearing assembly as herein disclosed rotatably supports a pair of disc blades in a manner substantially as depicted in FIG. 4 of the drawings, i.e., the disc blades being character referenced by the numerals 17 having the letters x and y suffixes. The alternate embodiment of the bearing assembly, e.g., the bearing assembly 11a', differs slightly from the principal embodiment thereof. Accordingly, structure which is common to the two embodiments will be identified by the same character reference and the minor differences between the two embodiments will be disclosed in detail. The bearing assembly 11a' includes a pair of radial bearing means, individually designated 21 and 21', disposed at either end of the fixed hub means 37 with the thrust bearing means 27 being interposed therebetween. A modified spacer sleeve means 53 abuttingly engages the rotatable races, individually designated at 23, 23', respectively of the pair of radial bearing means 21, 21' which are maintained in an optimum spaced apart distance by the spacer sleeves 53'. The fixed races, individually designated at 25, 25', respectively of the pair of radial bearing means 21, 21' continuously engage the interior surface 47 of the hub means 37. The bearing assembly 11a' is void of the grease-seal means 63. However, the pair of radial bearing means 21, 21' preferably consists of the well known sealed bearings. Thus, the bearings 21, 21' shield the thrust bearing means 27 against dust and other harmful contaminants. The bearing assembly 11a' also includes a pair of snap-rings, individually designated as 69, 69' which are received in their respective annular groove 71, 71'.

The spacer sleeve means 53' differs slightly from the principal embodiment in that the sleeve means 53' does not extend outwardly from the hub means 37. More specifically, the distal end 67 thereof has an abutting relationship with the rotatable race 23' which itself has an outwardly protruding portion as at 77 for abuttingly engaging the spacer member 57 as clearly shown in FIG. 4 of the drawings.

Likewise, the rotatable axle 39' differs slightly from the principal embodiment in that the axle 39' preferably is not threaded at either end but carries a standard bolt head as at 81, in lieu of the second nut 43, i.e., since the axle 39' is considerably shorter than the principal embodiment one nut 43 is deemed sufficient.

Although the invention has been described and illustrated with respect to preferred embodiments thereof, it should be understood that it is not to be limited since changes and modifications may be made therein which are within the full intended scope of the invention.

I claim:

1. In farm implements of the type having rotatable disc blade means for obliquely attacking and preparing the soil, the improvement which comprises bearing means for axially supporting said disc blade means while simultaneously providing optimum support thereof against the lateral forces acting thereon, said bearing means including at least one radial bearing means having inner and outer axial races for taking the axle load, at least one thrust bearing means having a pair of lateral races for taking the lateral load, fixed hub means having a rotatable axle extending therethrough with at least a pair of disc blade members being disposed on either side of said hub means and being attached to said axle for rotation therewith, said radial bearing means and said thrust bearing means being circumferentially disposed about said axle and engaging the interior of said hub means with said radial and said thrust bearing means respectively having fixed and rotatable races, said hub means including a reduced diameter portion establishing inwardly directed annular shoulder means for engaging and restingly supporting said fixed race of said thrust bearing means, and spacer sleeve means slip-fitted about said axle with said thrust bearing means being circumposed thereabout for establishing an optimum non-binding relationship between said pair of lateral races irrespective of lateral compression forces developed in frictionally urging said pair of disc blade members together, said spacer sleeve means including an enlarged diameter portion establishing outwardly directed annular shoulder means for engaging and restingly supporting said rotatable race of said thrust bearing means.

2. The combination as set forth in claim 1 in which said bearing means includes a pair of radial bearing means disposed at either end of said fixed hub means with said thrust bearing means being interposed therebetween, said spacer sleeve means abuttingly engaging said rotatable races of said pair of radial bearing means which are maintained in an optimum spaced apart distance by said spacer sleeve means, and said fixed races of said pair of radial bearing means contiguously engaging said hub means.

3. The combination as set forth in claim 2 in which said pair of radial bearing means consist of sealed bearings, thus shielding said thrust bearing means against dust and other harmful contaminants.

4. The combination as set forth in claim 1 in which said bearing means includes grease-seal means disposed at one end of said fixed hub means with said radial bearing means being disposed at the opposite end thereof, said thrust bearing means being interposed between said grease-seal means and said radial bearing means, the proximal end of said spacer sleeve means having an abutting engagement with said rotatable race of said radial bearing means and said grease-seal means being circumposed about said spacer sleeve means, the distal end of said spacer sleeve means extending outwardly from said hub means, and said fixed race of said radial bearing means contiguously engaging said hub means.

5. The combination as set forth in claim 4 in which said radial bearing means consists of sealed bearings, thus said grease-seal means and said sealed radial bearing means jointly shield said thrust bearing means against dust and other harmful contaminants.

6. The combination as set forth in claim 1 in which is included grease-gun fitting means for facilitating filling said hub means with lubricating grease.

* * * * *